United States Patent [19]

Heck

[11] Patent Number: 4,719,451

[45] Date of Patent: Jan. 12, 1988

[54] PREDICTIVE ENCODING

[75] Inventor: Berthold Heck, Nuremberg, Fed. Rep. of Germany

[73] Assignee: U.S. Philips Corporation, New York, N.Y.

[21] Appl. No.: 879,655

[22] Filed: Jun. 27, 1986

[30] Foreign Application Priority Data

Jul. 5, 1985 [DE] Fed. Rep. of Germany ....... 3524069

[51] Int. Cl.$^4$ .............................................. H03M 7/36
[52] U.S. Cl. ............................ 340/347 DD; 358/136
[58] Field of Search ............ 332/11 D; 340/347 DD; 358/135, 136; 360/40; 375/26, 27, 28, 29, 30, 31; 365/230, 231

[56] References Cited

U.S. PATENT DOCUMENTS

| | | | |
|---|---|---|---|
| 3,553,361 | 1/1971 | Mounts | 358/136 |
| 3,937,878 | 2/1976 | Judice | 358/136 |
| 4,492,983 | 1/1985 | Yoshida et al. | 358/260 |

*Primary Examiner*—William M. Shoop, Jr.
*Assistant Examiner*—Richard K. Blum
*Attorney, Agent, or Firm*—Thomas A. Briody; Jack Oisher; William J. Streeter

[57] ABSTRACT

A predictive encoding arrangement for use in a video digital imaging system wherein sequences of codewords are produced by a video signal source corresponding to sequential elements of a video picture, codewords for any given picture element being successively produced in successive picture periods. Codewords for the N picture elements of each picture period are stored in a picture memory. An encoder encodes the difference between codewords supplied by the video signal source and codewords read out from the memory, the encoded codewords than being decoded by a decoder and supplied to the memory for storage therein. A cyclic address counter operating at the codeword rate cyclically generates N-K memory addresses for storage of codewords in the memory, wherein N>K and K is the number of codeword periods for the encoder and decoder to produce a decoded codeword in response to a codeword from the video signal source.

2 Claims, 2 Drawing Figures

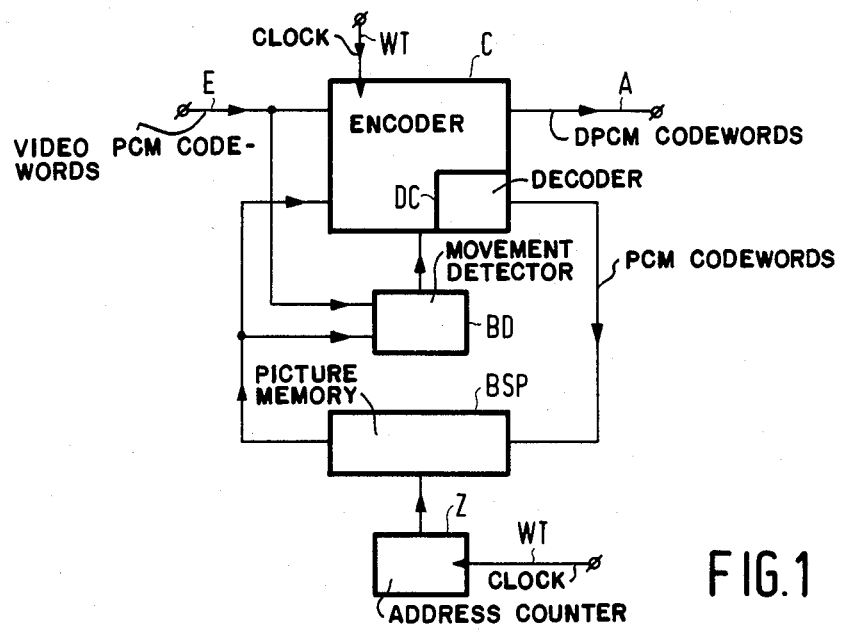
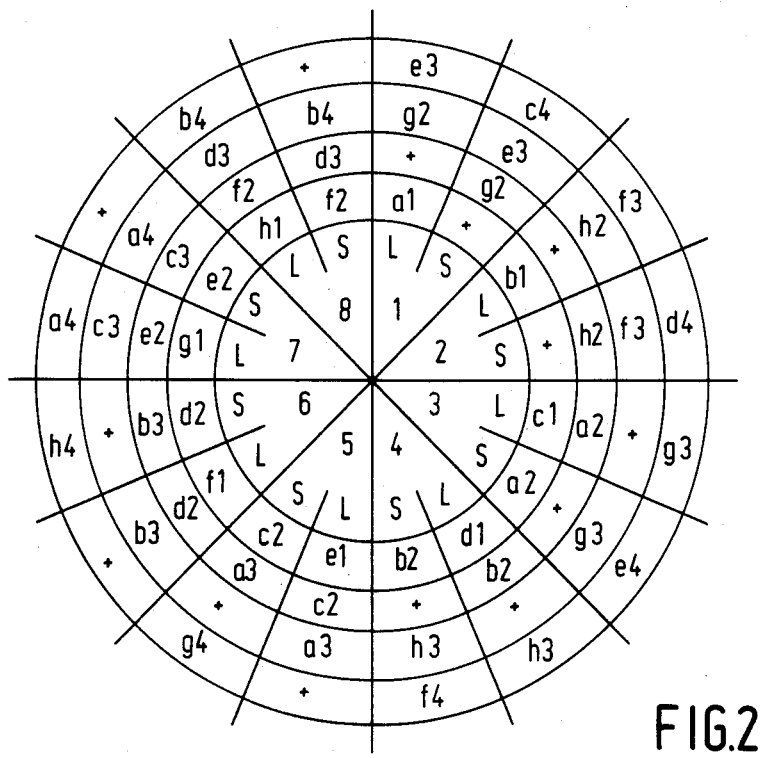

PREDICTIVE ENCODING

BACKGROUND OF THE INVENTION

1. Field of the Invention

The invention relates to an arrangement for predictive encoding in which an encoder encodes the difference which exist between the codewords supplied by a source and the codewords obtained from the output of the encoder after being converted by a decoder and delayed by a memory over a number of word periods, and in which the write-read operation of the memory is controlled by a cyclic address counter which is controlled by pulses occurring at word rate.

Such arrangements are required, for example, in video conference systems; they play a significant role in bit rate reduction.

2. Description of the Prior Art

An arrangement of the type mentioned above is described, for example, in published European Patent Application No. 0,103,380. According to this Application the PCM codewords originating from a video camera are applied to a DPCM encoder at word rate, which codewords contain information on luminance and chrominance of the picture elements. Together with each codeword from the video camera a codeword from a picture memory is applied to the DPCM encoder, which codeword is associated with the same picture element but is delayed over one full picture period. The PCM codewords written into the picture memory are produced by reconverting the DPCM codewords using a DPCM decoder. The known arrangement is an encoding arrangement with a so-called feedback prediction.

Writing and reading of the codewords from the picture memory can be controlled with a single address counter which is controlled by control pulses occurring at word rate. The address counter cyclically generates all addresses of the memory locations of the picture memory, each such location storing a codeword associated with a given picture element. When the address counter generates an address, the codeword stored in the relevant memory location is read and subsequently a new codeword associated with the same picture element is stored. Reading and writing of the codewords associated with a given picture element are temporally offset over one full picture period, but has to take place within 400 ns, for example, in a video conference system. This means, inter alia, that the encoder and the decoder must generate the new codeword within 400 ns. If the encoder and decoder are not so fast, for example, if they require 3 word periods to generate the new codeword, it is impossible in a simple RAM to always use the same memory location for a picture element. If this situation is encountered, two counters and one picture memory must be used such that these counters seperately control the write and read processes. Such a memory is used, for example, in circuit arrangements for converting motion picture signals, as proposed in published European Patent Application No. 0,089 919. If in the relevant case—in which there is a delay of 3 word periods between the instant at which a codeword is read from the memory and a new codeword for the same picture element is generated—such a picture memory is used, the two counters should both cyclically generate the N addresses of the picture memory, phase shifted over three word periods, with the leading counter controlling the reading process and the trailing counter controlling the writing process and N being the number of codewords to be stored and associated with a full picture. It is also feasible to delay the addresses of a counter by three word periods and to subsequently control the writing process with the delayed addresses; in each case an extremely fast RAM and high-frequency pulses would be required for the control.

SUMMARY OF THE INVENTION

It is an object of the invention to provide a circuit arrangement of the type described in the opening paragraph in which a simple write-read memory (RAM) can be utillized as a picture memory if the internal processing time of the encoder and the decoder covers at least one word period.

This object is realised by employing a counter to cyclically generate N-K memory addresses, wherein N>K and K is the number of word periods required by the cascade arrangement of encoder and decoder to generate a new codeword for a picture element in response to the codeword read from the memory for that same picture element.

BRIEF DESCRIPTION OF THE DRAWINGS

An embodiment of the invention will be described in greater detail with reference to the accompanying Figures, in which:

FIG. 1 shows the essential components of an encoder as used, for example, in a video conference system, and FIG. 2 is a diagram to clarify the operation of a picture memory according to the invention.

DESCRIPTION OF THE PREFERRED EMBODIMENT

According to FIG. 1 the video signal E originating from a video camera is applied to the DPCM encoder C in the form of 8-bit PCM codewords. Each codeword comprises the luminance or chrominance value of a picture element. In the relevant example the information for a full picture consists of 286 lines comprising 256 luminance values separated by 4 filler words from 52 chrominance values. Successive lines are separated by a further eight identical filler words. A further 26.5 lines—with 14 lines covering the first field and 12.5 lines covering the second field—consist of identical filler words. Consequently a full picture period comprises 100000 codewords. When scanning the picture, these codewords coincide with clock pulses WT at a word rate—also referred to as the picture element rate—of 2.5 MHz. A binary windowing signal (not shown in FIG. 1), is also available and which only assumes the binary value of zero when the filler words occur. During those intervals switching processes are carried out in the receiver and the transmitter.

At an edge of the clock pulse WT a codeword of the video signal and a codeword delayed over N=100000 word periods and stored in a picture memory BSP is received in the DPCM encoder C and are converted into a DPCM codeword. The DPCM code words form the output signal A of this encoder. In parallel therewith the DPCM codeword is recoded by a decoder DC into a PCM codeword; the recoded PCM codeword is distinguished from the PCM codeword of the video signal E only by possible encoding errors. In the present embodiment of the circuit arrangement, 16 word periods occur between the input of two PCM codewords into the encoder C and the output of the recoded PCM codeword. According to the invention an address counter Z which controls the write and read operations of picture memory BSP and which is controlled by the clock pulses WT cyclically generates 99984 addresses. In each cycle the codeword associated with a paricular picture element and the filler words are stored in distant addresses.

The presence of a windowing signal—not shown in FIG. 1—provides the possibility of a reduction by approximately 8% of the number of required memory locations in that the counter Z is stopped by suppression of the clock pulses when the windowing signal and a delayed version thereof, delayed over 16 word periods, both assume the binary value zero. A gating of the delayed and non-delayed windowing signals, for example, with an OR gate whose output signal is subsequently gated with the clock signal for the counter Z by an AND gate, results in the required effect on the counter Z. Consequently substantially only codewords are stored in the picture memory which are associated with the picture elements; most filler words are not stored. In the present embodiment these measures lead to a reduction of required memory locations to 91504, the counter Z cyclically generating the addresses of these memory locations only.

A movement detector BD receives the same codewords as the encoder C and for use in the invention its speed of operation requires an additional delay in the encoder and the decoder. For example, the above-mentioned delay of 16 word periods in the encoder C and the decoder DC is not only a result of their limited speed of operation, but additional delay members have been included in the encoder C and the decoder DC in order to coordinate their speed of operation with the speed of operation of the movement detector BD.

The movement detector BD checks whether the difference between two simultaneously entered codewords exceeds a given threshold; if this is not the case, no DPCM codeword is generated and outputted.

To clarify the processes in the picture memory BSP, an essentially simpler, however unrealistic example, will now be considered; the duration of a full picture period being assumed to cover 11 clock periods. The associated codewords are assumed to consist of eight codewords carrying information of eight picture elements, and of three filler words. All codewords which are associated, for example, with the first full picture period will be symbolized by the following sequence: a1, b1, c1, d1, e1, f1, g1, h1, +, +, +.

The symbols denoted by characters represent the information-carrying words and the crosses represent the filler words; the corresponding words of the second and all further full picture periods being only distinguished by their numerical suffix. The delay in the encoder and the decoder is assumed to cover two word periods. The required number of memory locations in the picture memory BSP would then be 9; the possible suppression of counting pulses due to the filler words not being taken into account. However, since one filler word does not need to be stored, the actual number of memory location is 8.

Each of these memory locations is symbolized in FIG. 2 by one of the circular sectors 1 to 8. The counter Z thus cyclically generates eight addresses; each cycle is indicated in FIG. 2 by a circle, the first cycle is indicated by the inner circle and the subsequent cycles are indicated by the circles located further away from the centre. When the counter Z is adjusted to one of the addresses 1 to 8, the codeword entered in the subsector L of a memory location is read and the codeword entered in the subsector S is written.

The situation in which the codeword a1 is stored in the memory location 1, the codeword b1 is stored in the memory location 2 and finally the codeword h1 is stored in the memory location 8 is arbitrarily chosen as an initial situation.

When the codeword a1 is read from the picture memory BSP, the codeword a2 is available at the video signal input of the encoder C. At the output of the decoder DC there is available a filler word +, due to the delayed processing, which filler word is written in the memory location 1 and is stored as a substitute for the codeword a1. At the next clock pulse the codeword in memory location b1 is read and a further filler word is written in the memory location 2 instead. At the third clock pulse, with at which the codeword in memory location c1 is read, the codeword a2 delayed with respect to codeword a1 over a full picture period is generated by the decoder DC and written in the memory location 3.

If one proceeds clockwise through the sectors 1 to 8 of FIG. 2 from the centre to the circumference in a spiral form, the above-mentioned codeword sequence of a full picture results for all subsectors L and for all subsectors S with the distinction that only two filler words in each picture period succeed the codewords of the picture elements in that period. The reason for this is the above-mentioned suppression of clock pulses by means of the windowing signal and the windowing signal delayed over two word periods. In the relevant embodiment one clock pulse per full picture period is suppressed, thus saving one memory location.

What is claimed:

1. In a video digital imaging system for receiving sequences of codewords from a video signal source corresponding to sequential elements of a video picture, all codewords having the same codeword period and successive codewords for a given picture element being produced in successive picture periods, and in which the codewords for each picture period are stored in a read-write picture memory; an improved arrangement for predictive encoding of such received codewords, comprising:

a picture memory for storing codewords for the number N of picture elements in each picture period, the codewords of a given picture element in successive picture periods being stored in the same address in such memory, such memory having an input for receiving codewords to be stored therein and an output at which a stored codeword is produced N codeword periods after it was received from the video signal source;

an encoder having a first input connected to said video signal source to receive codewords therefrom, a second input connected to the output of said memory to receive stored codewords therefrom, and an output at which it produces replacing encoded codewords for each picture element in successive picture periods corresponding to the difference between the codewords received at said first and second input terminals;

a decoder connected to said encoder for decoding the replacing codewords produced thereby and supplying such decoded replacing codewords to the input of said picture memory for storage therein; and an address counter cyclically operated by clock pulses occurring at the codeword period and connected to said picture memory for generating N-K memory addresses therein for the codewords to be stored in said picture memory, wherein N>K and K is the number of codeword periods required for the encoder and decoder to produce a decoded codeword in response to a codeword received from said video signal source.

2. A predictive encoding arrangement as claimed in claim 1, wherein said received codeword sequences comprise filler words, and the memory addresses generated by said address counter do not include addresses for storing such filler words in said picture memory; whereby substantially only codewords corresponding to picture elements are stored in said picture memory.

* * * * *